United States Patent [19]

Scheurer

[11] Patent Number: 5,121,826
[45] Date of Patent: Jun. 16, 1992

[54] APPARATUS FOR AND METHOD OF TRANSPORTING GROUPS OF LAPS OR EMPTY LAP TUBES

[75] Inventor: Paul Scheurer, Andelfingen, Switzerland

[73] Assignee: Maschinenfabrik Rieter AG, Winterthur, Switzerland

[21] Appl. No.: 470,590

[22] Filed: Jan. 26, 1990

[30] Foreign Application Priority Data

Feb. 8, 1989 [CH] Switzerland .................. 00431/89

[51] Int. Cl.$^5$ .................................. B65G 37/00
[52] U.S. Cl. ............................ 198/369; 414/222; 414/786
[58] Field of Search ............... 414/273, 331, 786, 910, 414/911, 222, 225; 901/1; 198/465.1, 487.1, 803.12, 369

[56] References Cited

U.S. PATENT DOCUMENTS

| | | |
|---|---|---|
| 4,528,721 | 7/1985 | Hera . |
| 4,538,950 | 9/1985 | Shiomi et al. ................. 414/222 |
| 4,694,949 | 9/1987 | Nakagawa ............... 198/465.1 X |
| 4,697,979 | 10/1987 | Nakashima et al. ............ 901/49 X |
| 4,721,262 | 1/1988 | Langen .................... 414/331 X |

FOREIGN PATENT DOCUMENTS

| | | |
|---|---|---|
| 0118600 | 9/1984 | European Pat. Off. . |
| 1411398 | 8/1965 | France . |
| 572529 | 2/1976 | Switzerland . |
| 2153767 | 8/1985 | United Kingdom . |
| 2168938 | 7/1986 | United Kingdom . |

OTHER PUBLICATIONS

Publication "LapLifter 890", published by Zinser, Technologie in Garn.
Publication "SuperLap 810", published in Zinser, Technologie in Garn.
"Zinser Novum", Textilmaschinen, Dec. 22, 1988.

Primary Examiner—Robert J. Spar
Assistant Examiner—Donald W. Underwood
Attorney, Agent, or Firm—Sandler, Greenblum & Bernstein

[57] ABSTRACT

There is provided an apparatus for and a method of transporting groups of laps and empty lap tubes between lap-forming machines and lap-processing machines by a shifting bridge provided with a drive. There are known transport systems whereby the follow-up of reverse laps is effected only subsequent to a "lap depletion signal". For this reason, an apparatus and a method are suggested and according to which the positioning of the drivable shifting bridge is controlled by a master computer which is connected to the lap-processing machines and the lap-forming machines as well as to the drivable shifting bridge.

11 Claims, 1 Drawing Sheet

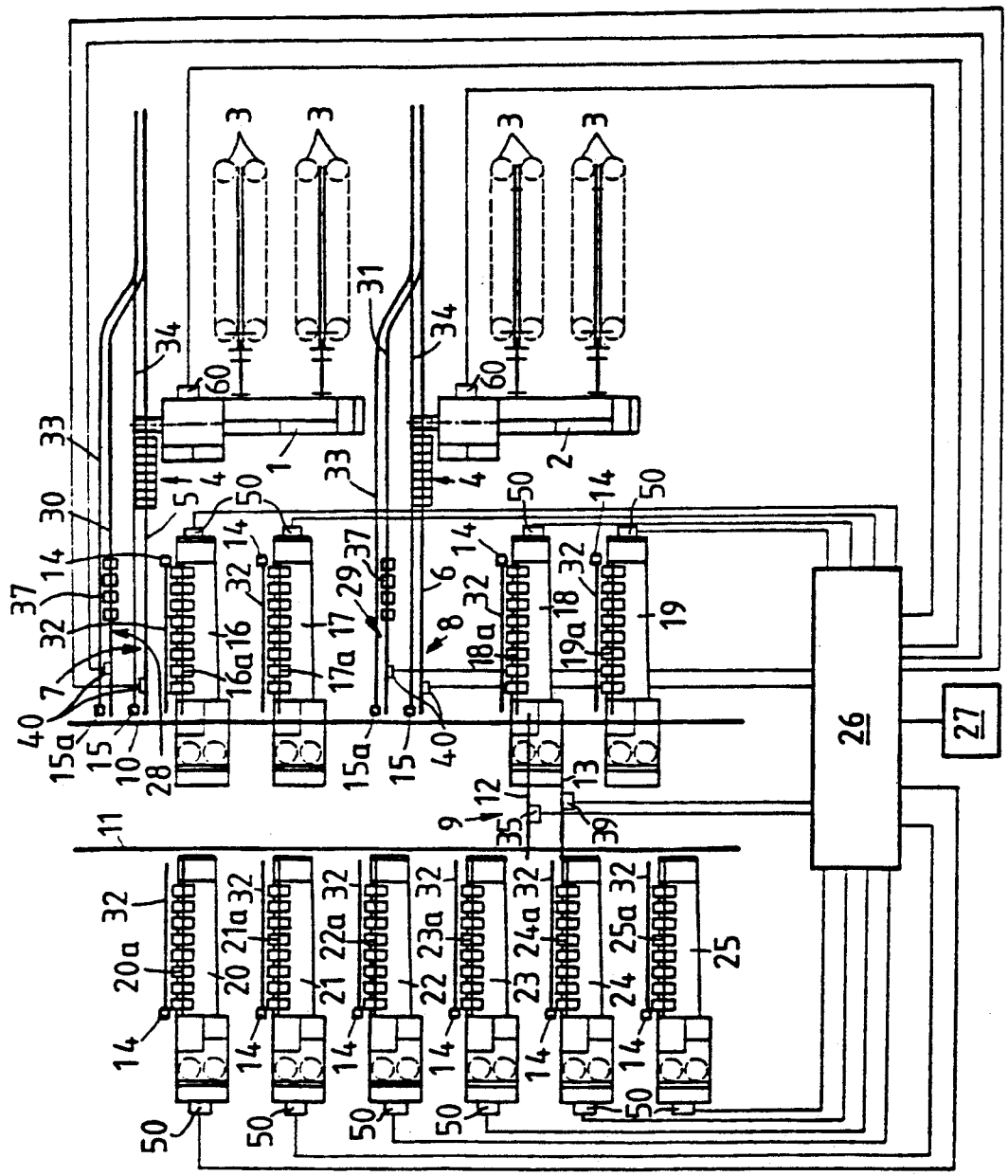

APPARATUS FOR AND METHOD OF TRANSPORTING GROUPS OF LAPS OR EMPTY LAP TUBES

BACKGROUND OF THE INVENTION

The present invention relates to a new and improved apparatus for, and method of, transporting groups of laps or empty lap tubes.

In its more specific aspects, the present invention is directed to a new and improved apparatus for, and method of, transporting groups of laps or empty lap tubes between at least one lap-forming machine and a plurality of lap-processing machines by means of a drivable shifting or displaceable bridge provided with drive means, the shifting bridge being displaceable in a direction substantially transverse to the infeed lines of the at least one lap-forming machine and of the lap-processing machines.

Various systems are known for the transport or conveyance of laps or empty lap tubes in the combing room of a spinning mill, whereby the laps are conveyed individually or in groups by means of a conveyor system to the locations where the laps are required for processing. For instance, the Zinser "LapLifter 890" produced by Zinser Textilmaschinen GmbH located at 7333 Ebersbach, West Germany, comprises a lap transport system provided with a portal crane, whereby single or individual laps supplied by a lap-forming machine are delivered to following combing machines. In such case, the follow-up lap supply can be considered a "wild" or unprogramed change. As disclosed in the Zinser technical documentation "SuperLap 810" of the aforementioned Zinser Textilmaschinen GmbH, a lap-forming machine supplies several following combers or combing machines.

These known transport or conveying installations are controlled by means of relatively invariable and predetermined indicator or reporting and command signals. In this manner, it can occur that the reserve laps are not available in good time for a number of individual combing machines, thus causing a more or less long and undesired standstill of the relevant combing machines.

SUMMARY OF THE INVENTION

Therefore, with the foregoing in mind, it is a primary object of the present invention to provide a new and improved apparatus for, and method of, transporting groups of laps or empty lap tubes, which apparatus and method do not exhibit the aforementioned drawbacks and shortcomings of the prior art.

A further significant object of the present invention aims at providing a new and improved apparatus for, and method of, transporting groups of laps or empty lap tubes, by means of which the follow-up or supply of reserve laps required at the combing machines is timely effected.

Now in order to implement these and still further objects of the present invention, which will become more readily apparent as the description proceeds, the apparatus of the present development is manifested, among other things, by the features that a master computer is provided for controlling the displacement and the positioning of the drivable shifting or displaceable bridge and that the master computer is connected to the plurality of lap-processing machines, the at least one lap-forming machine as well as to the drivable shifting bridge.

By virtue of the master computer interlinking the transport or conveyor system with the lap-forming and the lap-processing machines it is possible to ensure a continuous monitoring of the lap-processing and the lap-forming operations, whereby the transport or conveyor system, i.e. the shifting bridge, can be logically positioned by means of the master computer. In other words, the drivable shifting bridge is accurately positioned by means of the master computer to the location where the shifting bridge must carry out the next transport operation and the next transfer or delivery operation.

It is advantageous to allocate to the lap-forming machines at least one buffer sector for a given number of laps. In this manner, there can be transported at any time, even if no reserve laps are momentarily required, a predetermined number of laps by means of the drivable shifting bridge into a stand-by position of the associated combing machine which, in accordance with the indication or signal to the master computer, is chronologically the next lap-processing machine requiring follow-up supply of reserve laps. The predetermined number of laps is governed by the number of combing heads of the combing machines.

The installation of a further buffer zone for the empty lap tubes at the at least one lap-forming machine increases the flexibility of the drivable shifting bridge, since the recycling and return delivery of the empty lap tubes to the at least one lap-forming machine is ensured and the shifting bridge is thus again free for further transport operations.

The buffer sector allocated to the at least one lap-forming machine for a predetermined number of laps and the buffer zone provided at the at least one lap-forming machine for the empty lap tubes are connected to respective sensors which, in turn, are connected to the master computer.

The at least one lap-forming machine and the lap-processing machines advantageously comprise sensors for continuously monitoring the lap size and these sensors are connected to the master computer.

The connection of the buffer sector, the buffer zone and the sensors for direct lap monitoring to the master computer renders possible an accurately timed control. If several lap-forming machines are in an interlinked system with lap-processing machines, it is advantageous to connect the master computer to an input unit or control desk or console for manual entry of predetermined signal values. This is particularly important when working with different lap blends.

As alluded to above, the invention is not only concerned with the aforementioned apparatus, but also concerns a new and improved method of transporting groups of laps or empty lap tubes. The method aspects of the present development contemplate providing a master computer and continuously transmitting to this master computer signals concerning the position of the drivable shifting bridge, and certain lap-related parameters, such the contents of the buffers, (i.e., laps and empty tubes) the moment of time of the last lap-change interval at the lap-processing machines, the grade of lap material, and the lap-size at the lap-processing machines. The method aspects further include determining a control signal by means of the master computer by taking into account the signals continuously transmitted to the master computer, and controlling the movement and positioning of the drivable shifting bridge and the transport of the groups of laps or empty lap tubes in accordance with the control signal of the master computer.

BRIEF DESCRIPTION OF THE DRAWINGS

The invention will be better understood and objects other than those set forth above will become apparent when consideration is given to the following detailed description thereof. Such description makes reference to the annexed drawing wherein the single figure shows a schematic top plan view of an interlinked lap transport system constructed according to the invention.

DETAILED DESCRIPTION OF THE PREFERRED EMBODIMENTS

Describing now the drawing, it is to be understood that to simplify the showing thereof, only enough of the structure of the apparatus for transporting groups of laps or empty lap tubes has been illustrated therein as is needed to enable one skilled in the art to readily understand the underlying principles and concepts of this invention.

Turning attention now to the exemplary embodiment of apparatus, as schematically depicted in the single figure, and suitable for the performance of the inventive method, there are shown two lap doubling machines 1 and 2, by means of which fiber slivers drawn from cans 3 are doubled and drafted, the thereby formed lap then being wound on an associated tube. The thus produced laps 4 are grasped by suitable not particularly illustrated grippers and by means of which the laps 4 are conveyed via guide rails 5 and 6 to respective buffer stations 7 and 8. The displacement of the laps 4 is effected by runners 15 which are displaceably mounted at check rails 34 arranged substantially parallel to the guide rails 5 and 6. These buffer stations 7 and 8 constitute at the same time a delivery station for a following transport device or system.

This transport device or system comprises a drivable shifting or displaceable bridge 9 which is guided at the rails or tracks 10 and 11. This shifting bridge 9 is provided with a suitable travel drive 35. Furthermore, the shifting bridge 9 is provided with two receiving rails 12 and 13.

The two lap doubling machines 1 and 2 depicted in the single figure of the drawing are followed, for example, by ten combing machines 16 through 25, in which the laps 4 are unwound, combed out and formed into a fiber sliver subsequent to a drafting operation. As an extension to the two receiving rails 12 and 13 of the drivable shifting bridge 9, the combing machines 16 through 25 are equipped with rails 16a through 25a, respectively, such rails being provided to receive laps 4 or to discharge empty lap tubes. Check rails 32 are mounted substantially parallel to the respective rails 16a through 25a and are provided each with a runner 14 for displacing the laps 4 or the empty lap tubes.

Both lap doubling machines 1 and 2 as well as all ten combing machines 16 through 25 are connected to a master computer 26 by means of connecting lines. At the same time, there is provided a connection between the master computer 26 and the travel drive or drive elements 35 of the shifting bridge 9. Furthermore, a position detector device 39 is provided at the shifting bridge 9 for detecting the position of the latter. Such position detector device 39 is likewise directly connected to the master computer 26.

Receiving rails 30 and 31 are provided for receiving and recycling empty lap tubes 37. These receiving rails 30 and 31 are arranged substantially parallel to the guide rails 5 and 6 of the lap doubling machines 1 and 2 and are of such length that they can serve as empty-tube buffers 28 and 29 for the empty lap tubes 37. Check rails 33 are mounted substantially parallel to the receiving rails 30 and 31. Runners 15a, displaceably mounted at the check rails 33, are provided for drawing off the group of empty lap tubes 37 from one of the receiving rails 12 and 13 of the drivable shifting bridge 9, for further conveyance of the group of empty lap tubes 37 along the receiving rails 30 and 31 and, finally, returning the group of empty lap tubes 37 to the lap doubling machines 1 and 2.

The buffer stations or buffers 7, 8 and 28, 29 are connected to the master computer 26 by means of sensors 40.

The master computer 26 is preceded by a control desk or input unit 27, by means of which the master computer 26 can be appropriately set or manually controlled by override action.

If two different blends are processed on the lap doubling machines 1 and 2, only combing machines provided for such blends can be supplied, but in each case with one and the same blend.

The combing machines 16 through 25 are provided with respective sensors 50 which carry out the continuous monitoring of the lap diameter and transmit corresponding signals to the master computer 26. These signals are stored in the master computer 26, whereby the latter computes and determines the moment of time at which latest a group of reserve laps 4 must be held in readiness.

The lap-forming process in the lap doubling machines 1 and 2 is carried out in a similar manner, whereby by means of sensors 60, on the one hand, the presence of a complete group of laps 4 is indicated at the master computer 26, and, on the other hand, the receiving capacity of the empty-tube buffers 28 and 29 is signalled to the master computer 26. The position of the drivable shifting bridge 9 at the rails or tracks 10 and 11 is likewise continuously transmitted to the master computer 26 by the position sensor or detector device 39. By virtue of the available data it is possible by means of the master computer 26 to carry out accurately and without loss of time the transport of the laps 4 to the combing machines 16 through 25 by means of a logically controlled shifting bridge 9, taking into account all operating conditions at the individual machines and observing blends which possibly are to be differently processed. Likewise, there is carried out the recycling of the empty lap tubes 37 discharged at the combing machines 16 through 25, whereby the empty lap tubes 37 are conveyed via the receiving rail 12 and the laps 4 are conveyed via the receiving rail 13. The displacement of a not particularly shown group of suitable grippers, which retain the laps 4 or the empty lap tubes 37, is effected by the runners 14 or 15 or 15a.

The runners 14, 15 and 15a can be advantageously provided with a controlled self-contained drive, whereby the control thereof can likewise be effected by the master computer 26. Other known movement elements can be provided in place of the runners 14, 15 and 15a.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. An apparatus for transporting groups of laps and empty lap tubes between at least one lap-forming machine and a plurality of lap-processing machines, which machines have predetermined infeed lines, and comprising:
    a drivable shifting bridge which is displaceable in a direction substantially transverse to said predetermined infeed lines;
    a master computer being connected to the at least one lap-forming machine, to the plurality of lap-processing machines as well as to said drivable shifting bridge;
    said master computer comprising means for controlling the displacement and the positioning of said drivable shifting bridge as a function of a lap-related parameter at said at least one lap-forming machine and said plurality of lap-processing machines;
    said predetermined infeed line of the at least one lap-forming machine comprising at least one buffer sector for a predetermined number of laps;
    said at least one lap-forming machine being provided with a further infeed line for receiving the empty lap tubes;
    said further infeed line having a predetermined length which renders possible the reception of a predetermined number of empty lap tubes; and
    said drivable shifting bridge comprising at least one rail for selectively (1), directly transferring laps to and for receiving laps from said infeed lines of said lap-processing machines, and (2) directly transferring empty lap tubes to and for receiving empty lap tubes from said infeed lines of said lap-processing machines.

2. The apparatus as defined in claim 1, further including:
    a sensor for said at least one buffer sector for a predetermined number of laps; and
    said sensor being connected to said master computer.

3. The apparatus as defined in claim 1, wherein:
    said lap-processing machines include rails for receiving laps and discharging empty lap tubes, and wherein said at least one rail of said bridge is selectively alignable with said rails of said lap-processing machines.

4. The apparatus as defined in claim 1, further including:
    an input unit connected to said master computer and provided for manual input of predetermined signal values.

5. The apparatus as defined in claim 1, further including:
    a position detector device provided at said drivable shifting bridge for detecting the position of the latter; and
    said position detector device being connected with said master computer.

6. An apparatus for transporting groups of laps and empty lap tubes between at least one lap-forming machine and a plurality of lap-processing machines, which machines have predetermined infeed lines, and comprising:
    a drivable shifting bridge which is displaceable in a direction substantially transverse to said predetermined infeed lines;
    a master computer being connected to the at least one lap-forming machine, to the plurality of lap-processing machines as well as to said drivable shifting bridge;
    said master computer comprising means for controlling the displacement and the positioning of said drivable shifting bridge as a function of a lap-related parameter of said at least one lap-forming machine and said plurality of lap-processing machines; and
    said drivable shifting bridge comprising at least one rail to and from which laps and empty lap tubes are directly transferred between said bridge and said infeed lines.

7. The apparatus as defined in claim 6, further including:
    an input unit connected to said master computer and provided for manual input of predetermined signal values.

8. The apparatus as defined in claim 6, further including:
    a position detector device provided at said drivable shifting bridge for detecting the position of the latter; and
    said position detector device being connected with said master computer.

9. A method for transporting groups of laps and empty lap tubes between at least one lap-forming machine and a plurality of lap-processing machines by means of a drivable shifting bridge, comprising at least one rail to and from which laps and empty lap tubes are directly transferred between the bridge and infeed lines of the machines, the bridge being displaceable in a direction substantially transverse to the infeed lines of the machines, comprising the steps of:
    providing a master computer;
    providing buffers for a group of laps and a group of empty lap tubes at the infeed lines of the at least one lap-forming machine;
    continuously transmitting to the master computer signals concerning the position of the drivable shifting bridge, the contents of the buffers, the moment of time of a last lap-change interval at the lap-processing machines, the grade of the lap material, and the lap size of the lap-processing machines;
    determining a control signal by means of the master computer by taking into account the signals continuously transmitted to the master computer; and
    controlling the movement of the drivable shifting bridge and the transfer of the laps and the empty lap tubes directly between said at least one rail and said in feed lines by means of the master computer.

10. The method as defined in claim 9, further including the step of:
    selectively manually controlling the master computer.

11. The method as defined in claim 10, wherein:
    the step of selectively manually controlling the master computer entails manually overriding a control operation carried out by the master computer.

* * * * *